United States Patent
Vasudevan et al.

(10) Patent No.: US 10,400,123 B2
(45) Date of Patent: Sep. 3, 2019

(54) INK COMPOSITION

(71) Applicant: Hewlett-Packard Development Company, L.P., Houston, TX (US)

(72) Inventors: Sundar Vasudevan, Corvallis, OR (US); Richard J. McManus, Corvallis, OR (US); Vladimir Jakubek, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 51 days.

(21) Appl. No.: 15/309,440

(22) PCT Filed: Jun. 6, 2014

(86) PCT No.: PCT/US2014/041367
§ 371 (c)(1),
(2) Date: Nov. 7, 2016

(87) PCT Pub. No.: WO2015/187180
PCT Pub. Date: Dec. 10, 2015

(65) Prior Publication Data
US 2017/0152390 A1    Jun. 1, 2017

(51) Int. Cl.
*B41J 2/17*    (2006.01)
*C09D 11/38*   (2014.01)
(Continued)

(52) U.S. Cl.
CPC .......... *C09D 11/38* (2013.01); *B41J 2/17503* (2013.01); *C09D 11/102* (2013.01);
(Continued)

(58) Field of Classification Search
None
See application file for complete search history.

(56) References Cited

U.S. PATENT DOCUMENTS

| 4,129,587 A | 12/1978 | Jennings et al. |
| 4,405,329 A | 9/1983 | Abel et al. |

(Continued)

FOREIGN PATENT DOCUMENTS

| CN | 1393492 | 1/2003 |
| CN | 1643042 | 7/2005 |

(Continued)

OTHER PUBLICATIONS

International Search Report and Written Opinion for International Application No. PCT/US2014/041367 dated Feb. 16, 2015, 9 pages.

*Primary Examiner* — Erica S Lin
(74) *Attorney, Agent, or Firm* — Dierker & Kavanaugh PC

(57) ABSTRACT

An ink composition includes a colorant, a co-solvent, a surfactant system, and water. The surfactant system consists of an acid, lithium, and a non-ionic surfactant. The acid is selected from the group consisting of oleic acid, linoleic acid, undecanoic acid, dodecanoic acid, tridecanoic acid, and combinations thereof. The non-ionic surfactant includes a hydrophilic head group to interact with the lithium and a hydrophobic tail to not sterically hinder formation of an anti-evaporative layer to be formed by the surfactant system. The non-ionic surfactant also excludes any ethyleneoxy groups.

17 Claims, 1 Drawing Sheet

(51) Int. Cl.
   *B41J 2/175* (2006.01)
   *C09D 11/102* (2014.01)
   *C09D 11/107* (2014.01)
   *C09D 11/324* (2014.01)
   *C09D 11/36* (2014.01)

(52) U.S. Cl.
   CPC .......... *C09D 11/107* (2013.01); *C09D 11/324* (2013.01); *C09D 11/36* (2013.01)

(56) References Cited

U.S. PATENT DOCUMENTS

| | | |
|---|---|---|
| 5,160,372 A | 11/1992 | Matrick |
| 5,258,064 A | 11/1993 | Colt |
| 5,472,490 A | 12/1995 | Sawamura et al. |
| 5,492,653 A | 2/1996 | Hochheimer et al. |
| 5,539,038 A | 7/1996 | Katsen et al. |
| 5,658,499 A | 8/1997 | Steinberg et al. |
| 5,734,403 A | 3/1998 | Suga et al. |
| 5,980,623 A | 11/1999 | Hiraoka et al. |
| 6,124,376 A | 9/2000 | Nichols et al. |
| 6,383,275 B1 | 5/2002 | Lin |
| 6,544,591 B2 * | 4/2003 | Slone ........................ B41N 3/08 427/384 |
| 7,695,555 B2 | 4/2010 | Kabalnov et al. |
| 7,705,069 B2 | 4/2010 | Reinhardt et al. |
| 7,901,499 B2 | 3/2011 | Kitamura et al. |
| 8,003,714 B2 | 8/2011 | Yamashita |
| 8,029,612 B2 | 10/2011 | Ishii et al. |
| 8,636,351 B2 | 1/2014 | Hasegawa et al. |
| 9,193,884 B2 | 11/2015 | Vasudevan et al. |
| 9,410,010 B2 | 8/2016 | Roberts et al. |
| 9,738,804 B2 | 8/2017 | McManus et al. |
| 2003/0060537 A1 | 3/2003 | Palazzo |
| 2004/0110865 A1 | 6/2004 | McCovick et al. |
| 2005/0004263 A1 | 1/2005 | Gould et al. |
| 2005/0048271 A1 * | 3/2005 | Iwasa ........................ B32B 7/06 428/195.1 |
| 2007/0040880 A1 | 2/2007 | Jackson et al. |
| 2007/0076068 A1 | 4/2007 | Guo et al. |
| 2007/0091156 A1 | 4/2007 | Jackson |
| 2008/0178766 A1 | 7/2008 | McGorrin |
| 2009/0031922 A1 | 2/2009 | Rengaswamy et al. |
| 2009/0047484 A1 | 2/2009 | Kitamura et al. |
| 2010/0075052 A1 | 3/2010 | Irita |
| 2010/0081740 A1 | 4/2010 | Jackson |
| 2011/0012954 A1 | 1/2011 | Brown et al. |
| 2011/0234695 A1 | 9/2011 | Yamazaki et al. |
| 2011/0236649 A1 | 9/2011 | Nishiki et al. |
| 2012/0156375 A1 | 6/2012 | Brust et al. |
| 2012/0162307 A1 | 6/2012 | Yamazaki |
| 2013/0057625 A1 | 3/2013 | Yamazaki |
| 2013/0108952 A1 | 5/2013 | Nakano et al. |
| 2013/0237661 A1 | 9/2013 | Brust et al. |
| 2013/0253130 A1 | 9/2013 | Berge |
| 2013/0267656 A1 | 10/2013 | Berge |
| 2013/0321521 A1 | 12/2013 | Fujie et al. |
| 2014/0017461 A1 | 1/2014 | Matsuyama |
| 2014/0071196 A1 | 3/2014 | Hihara et al. |

FOREIGN PATENT DOCUMENTS

| | | |
|---|---|---|
| CN | 1865362 | 11/2006 |
| CN | 101050326 | 10/2007 |
| JP | 2097576 | 4/1990 |
| TW | 201249937 | 12/2012 |
| WO | WO-96/10603 | 4/1996 |
| WO | WO-2004/080723 | 9/2004 |
| WO | WO-2009/034394 | 3/2009 |
| WO | WO-2011/115614 | 9/2011 |
| WO | WO-2013/095497 | 6/2013 |
| WO | WO-2013/192268 | 12/2013 |

* cited by examiner

INK COMPOSITION

BACKGROUND

Inkjet printing or recording systems are commonly used as an effective way to produce images on a print medium, such as paper. Generally, ink droplets are ejected from a nozzle by the inkjet printing system and onto the print medium to produce an image thereon. Examples of inkjet printing systems include thermal inkjet printers and piezo-electric inkjet printers.

BRIEF DESCRIPTION OF THE DRAWINGS

Features and advantages of examples of the present disclosure will become apparent by reference to the following detailed description and drawings, in which like reference numerals correspond to similar, though perhaps not identical, components.

DETAILED DESCRIPTION

Figure 1:
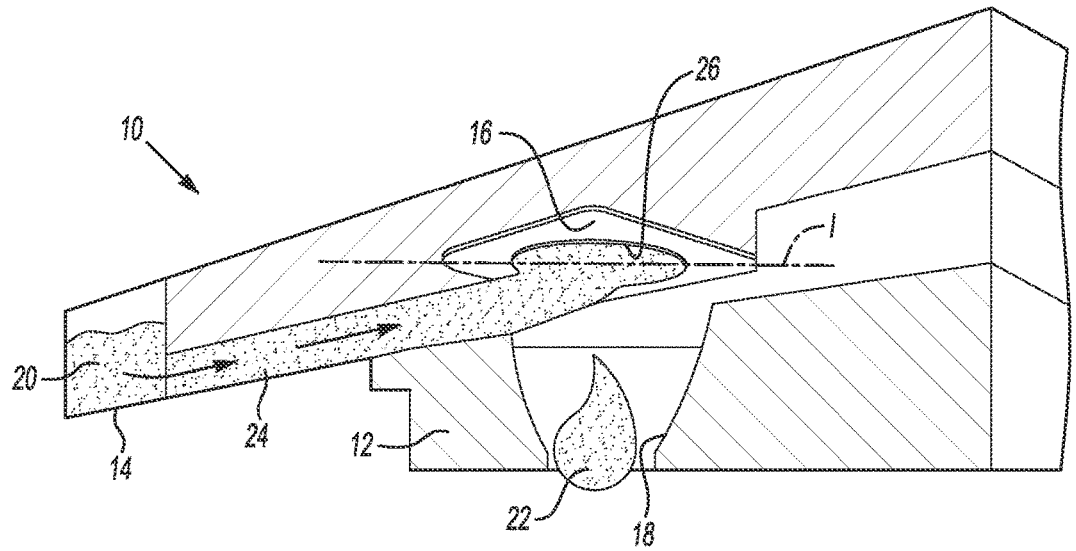
FIG. 1 is an enlarged, cutaway, cross sectional, perspective semi-schematic illustration of an example print cartridge.

Examples of the ink composition disclosed herein exhibit desirable print reliability and decap performance (thereby maintaining good nozzle health).

The term "decap performance," as referred to herein, means the ability of the inkjet ink to readily eject from the printhead, upon prolonged exposure to air. The decap time is measured as the amount of time that a printhead may be left uncapped and unused before the printer nozzles no longer fire properly, potentially because of clogging, plugging, or retraction of the colorant from the drop forming region of the nozzle/firing chamber. The length of time a thermal inkjet pen can remain unused and uncapped before spitting would be required to form an acceptable quality ink drop is called decap time, or first drop decap time. Another decap metric (referred to as "sustained decap" or "spit on page" (SoP) decap) is the number of spits required to get the pen healthy at a specific time interval. As an example of SoP decap, large format inkjet based printers including large stationary print bars may be uncapped and unused for relatively long periods of time (e.g., from about 10 minutes to about 8 hours), and may attempt to keep the nozzles healthy by randomly spitting each nozzle every few seconds. The longest decap time that would give acceptable first drop quality or the fewest number of spits required at any given decap time would be desirable for any given ink.

Generally, as water evaporates from an ink formulation, the percentage of organic components in the ink increases. As the ink becomes more enriched in the organic co-solvents and other nonvolatile components, a colorant (e.g., a dispersed pigment) therein which is strongly hydrophilic is pulled back/retracted into the bulk of the aqueous phase.

Examples of the present disclosure aid in controlling the degree/rate of pigment retraction in an efficient and cost-effective manner. Pigment retraction is referred to herein as "pigment ink vehicle separation" (PIVS).

As pigmented ink dries in an inkjet printhead, a rapid PIVS may take place (e.g., within about 1-4 seconds), which may result in the nozzles and/or the ink channel being substantially devoid of the colorant. As such, a rapid rate of PIVS is generally undesirable because of the idle (or decap) time being too short. To address PIVS, inkjet printers may force the printhead to spit onto a special absorbing pad/spittoon on a regular basis after a period of idle time (e.g., a predetermined number of spits per nozzle at a given frequency may maintain nozzle health of idle nozzles during printing). The rate of spitting is substantially controlled by the rate of PIVS. Very frequent spits are generally undesirable, because ink is consumed during spitting, and printing is slowed down.

In contrast, a slow rate of PIVS (e.g., from about greater than 4 seconds to about 60 seconds) is generally beneficial for the printhead functioning, for example, when the printhead is stored in an uncapped position, because it prevents the undesirable clogging of the nozzles or retraction of the colorant from the nozzle. Further, in some instances, it may be desirable for a print system to exhibit very slow PIVS (e.g., from greater than a minute to several hours).

Further, examples of the ink composition according to the present disclosure also provide improved decap performance for dye-based inks. In the case of both pigment-based and dye-based previously known inks, as water evaporates, a viscous plug may form at the nozzle in some instances. A subsequent ink drop would have to be fired through this viscous plug, and as such, the first few drops may not be ejected/ejected appropriately out of the orifice. Depending on the ink, successful ejection may occur after a couple of firing events. In contrast, examples of the ink composition of the present disclosure appear to prevent formation of this viscous plug (in pigment-based or dye-based inks), as well as controlling PIVS (in pigment-based inks).

Without being bound to any theory, it is believed that examples of a surfactant system in examples of the ink composition of the present disclosure form an anti-evaporative layer during uncapped non-use at an interface between the air and the ink composition in an orifice of a nozzle, thereby reducing evaporation of the water from the ink composition. The anti-evaporative layer may form in about 2 seconds or less of uncapped non-use. This anti-evaporative layer contributes to improving the decap time of the inks disclosed herein.

While the addition of a surfactant to an ink is often desirable for altering the surface tension and wetting characteristics of the ink, the present inventors have found that some surfactants deleteriously affect the formation of the anti-evaporative layer, and thus deleteriously affect the decap performance. As such, in the examples disclosed herein, a surfactant system has been identified that not only aids in the formation of the anti-evaporative layer, but also matches or exceeds acceptable surfactant performance in terms of lowering the surface tension and providing desirable wetting characteristics. The surfactant system consists of the combination of lithium, a particular acid, and a particular non-ionic surfactant. The particular non-ionic surfactant is selected so that its hydrophilic head group can interact with the lithium ion and so that its hydrophobic tail does not adversely interact with the hydrophobic tail of the fatty acid (i.e., does not sterically hinder formation of the anti-evaporative layer). The particular non-ionic surfactant also does not include any ethyleneoxy groups (i.e., polyoxyethylene groups). The particular non-ionic surfactant seems to exhibit a synergistic interaction with a lithium salt (lithium laurate, lithium oleate, etc.) of the anti-evaporative layer, which improves the decap performance.

In the examples disclosed herein, the particular non-ionic surfactant has been found to not only contribute to the formation of the anti-evaporative layer (and thus improve decap), but also to contribute to the ink having a desirable surface tension.

Previous anti-evaporative layer(s) include, for example, lithium salts of fatty acids. One example is schematically shown below:

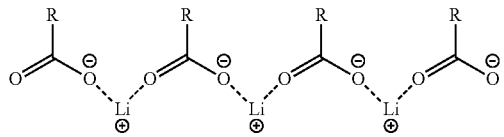
(I)

where R is the fatty acid tail and the dotted lines represent ion pair interactions between carboxylate ions of the fatty acid and the lithium ions. As mentioned above, the present inventors have found that some surfactants deleteriously affect the formation of this anti-evaporative layer (I), or a similar anti-evaporative layer. In particular, surfactants containing sulfonate heads (e.g., sodium dodecyl sulfate) and surfactants containing any ethyleneoxy groups may disrupt the formation of the anti-evaporative layer (or at least deleteriously affect decap performance), and thus are not suitable for the ink compositions disclosed herein.

With particular regard to surfactants containing ethyleneoxy groups, six moles of ethyleneoxy groups can coordinate one mole of lithium ions. In the example shown below, an ethoxylated surfactant (II) contains six ethyleneoxy groups that bind to a Li ion. In this example, $R_1$ may be a hydrophobic tail that may contain additional ethyleneoxy groups and $R_2$ may be a hydrogen atom or some other functional group:

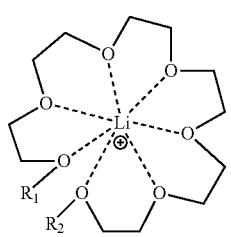
(II)

This type of surfactant (II) can disrupt the anti-evaporative layer (I) as shown in the following schematic representation:

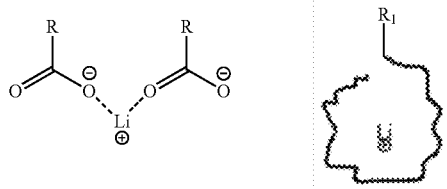
(III)

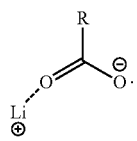

In (III), the ethyleneoxy groups of surfactant (II) are represented by the black line ending in the hydrophobic tail—group $R_1$. As illustrated, the surfactant comes to the air-ink interface, and its ethyleneoxy groups preferentially bind to the lithium ion, and thus prevent the formation of the anti-evaporative layer.

Unlike surfactants containing ethyleneoxy groups or sulfonate heads, the particular non-ionic surfactants disclosed herein include a hydrophilic head group that can interact with the lithium ion and also includes a hydrophobic tail that does not sterically hinder formation of the anti-evaporative layer. Any of these non-ionic surfactants exclude ethyleneoxy groups.

The interaction between the hydrophilic head group of the non-ionic surfactants disclosed herein and the lithium ion is analogous to hydrogen bonding interaction. Examples of suitable hydrophilic head groups capable of this interaction include hydroxyl (OH) group(s) or pyrrolidinone(s).

The hydrophobic tail does not sterically hinder formation of the anti-evaporative layer. In other words, the hydrophobic tail i) has an appropriate chain length that does not prevent the non-ionic surfactant from fitting into anti-evaporative layer along with the fatty acids, and/or ii) contains appropriate groups that do not prevent the non-ionic surfactant from fitting into anti-evaporative layer along with the fatty acids. Some examples of the non-ionic surfactant hydrophobic tail include ester group(s), $C_{11}$ to $C_{13}$ saturated alkyl chains, or $C_{18}$ mono to poly unsaturated alkyl chains. The chain length of the hydrophobic tail of the non-ionic surfactant depends, at least in part, on the hydrophilic head group. In an example, the chain length of the hydrophobic tail of the non-ionic surfactant may be similar to the chain length of the hydrophobic portion of the fatty acid when the non-ionic surfactant includes a single hydroxyl head group. As specific examples, 1-dodecanol (i.e., lauryl alcohol) may be selected as the non-ionic surfactant when dodecanoic acid (i.e., lauric acid) is selected as the fatty acid, and octadec-9-en-1-ol (i.e., oleyl alcohol) may be selected as the non-ionic surfactant when cis-octadec-9-enoic (i.e., oleic acid) is selected as the fatty acid for example. In another example, the chain length of the hydrophobic tail of the non-ionic surfactant may be shorter than the chain length of the hydrophobic portion of the fatty acid when the non-ionic surfactant includes dihydroxyl head groups. As specific examples, an acetylene diol or a tartrate ester of smaller length alcohols may be paired with either dodecanoic acid or octadecenoic acid.

Some specific examples of the non-ionic surfactant that may be used in the ink composition disclosed herein include acetylene diols, bis-tartrate esters, 1,2-hexanediol, mono alcohols, N-alkylpyrrolidinones, and combinations thereof. One example of the acetylene diol is SURFYNOL® 104, available from Air Products and Chemicals, Inc., Allentown, Pa. Examples of suitable bis-tartrate esters include diisoamyl tartrate, dibutyl tartrate, dibenzyl tartrate, and diisopropyl tartrate. Some examples of suitable mono alcohols include lauryl alcohol (i.e., 1-dodecanol), oleyl alcohol (i.e., octadec-9-en-1-ol), stearyl alcohol (i.e., 1-octadecanol), and combinations thereof. Examples of the N-alkylpyrrolidinone are N-octylpyrrolidinone and N-dodecylpyrrolidinone. Some commercially available N-alkylpyrrolidinones include SURFADONE® LP-100 (octylpyrrolidinone) and SURFADONE® LP-300 (dodecylpyrrolidinone), both of which are available from Ashland Inc., Covington, Ky.

In an example of the ink composition disclosed herein, the non-ionic surfactant is present in an amount ranging from about 0.01 wt % to about 0.3 wt % of the total weight of the ink composition. In another example, the amount of the non-ionic surfactant in the ink composition ranges from about 0.05 wt % to about 0.3 wt %. When multiple non-ionic surfactants are included, it is to be understood that the total amount of all of the non-ionic surfactants is within the given ranges.

As mentioned above, examples of the surfactant system also consist of lithium and an acid (e.g., a fatty acid surfactant) chosen from oleic acid (one cis double bond), linoleic acid (two cis double bonds), undecanoic acid, dodecanoic acid, tridecanoic acid, and combinations thereof.

The fatty acid surfactant has a carboxylate head and a long alkyl tail (e.g., saturated fatty acids having from 11 to 13 carbon atoms including the carboxylate head or unsaturated fatty acids having a chain length of 18 carbon atoms). The carboxylate group aids in forming the anti-evaporative layer, and thus appears to be contributing to good decap. In addition, the alkyl tail has one or two cis double bonds. It has been discovered that the corresponding fully saturated fatty acids with 14 carbons or more, or those with trans double bonds generally do not provide the same benefit for enhancing decap performance. As such, examples of the ink composition of the present disclosure exclude acids chosen from stearic acid (a fully saturated fatty acid with 18 carbons), elaidic acid (the trans isomer of oleic acid), linolenic acid (three cis double bonds), linear (as opposed to branched) saturated fatty acids having a carbon chain of fewer than 11 carbons, and linear saturated fatty acids having a carbon chain of more than 13 carbons, and combinations thereof.

In an example, the chosen acid is dodecanoic acid (also known as lauric acid).

The acid is present in an amount ranging from about 0.03 wt % to about 1.0 wt % of the total wt % of the ink composition. In another example, the amount of the acid present in the ink composition ranges from about 0.1 wt % to about 1.0 wt %.

It is to be understood that the lithium may be present in the composition as an ion in solution, or as a lithium salt of the acid. As an example, the lithium may be added to the ink composition in the form of a number of its salts, for example, lithium chloride, lithium bromide, lithium iodide, lithium hydroxide, lithium acetate, lithium benzoate, lithium nitrate, or combinations thereof. However, lithium carbonate is generally not desirable; as it appears to degrade decap performance in some instances.

Further, other alkali metals, e.g., sodium and/or potassium, may be present in examples of the ink composition. However, it is to be understood that the lithium aids in forming the anti-evaporative layer; whereas other alkali metals that may be present do not function to aid in formation of the anti-evaporative layer, nor do they hinder formation of the anti-evaporative layer.

In an example, the ink composition includes from about 50 ppm to about 400 ppm of the lithium.

Shown below are several examples of the anti-evaporative layer that may be formed using the surfactant system disclosed herein in the ink composition. The first example anti-evaporative layer (IV) is formed with lithium, the acid, and a diol as the non-ionic surfactant (e.g., SURFYNOL® 104 or diesters of tartaric acid), where R is the hydrophobic tail of the selected acid and $R_1$ and $R_2$ are the hydrophobic tails of the selected diol:

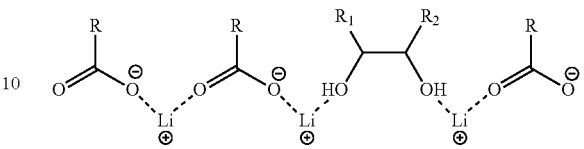

(IV)

The second example anti-evaporative layer (V) is formed with lithium, the acid, and N-alkylpyrrolidinone as the non-ionic surfactant, where R is the hydrophobic tail of the selected acid:

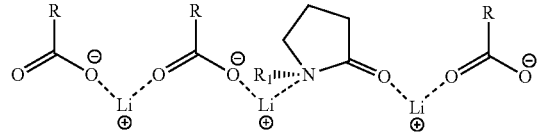

(V)

The third example anti-evaporative layer (VI) is formed with lithium, the acid, and the mono alcohol as the non-ionic surfactant (e.g., lauryl alcohol, oleyl alcohol, and/or stearyl alcohol), where R is the hydrophobic tail of the selected acid and $R_1$ is the hydrophobic tail of the selected mono alcohol:

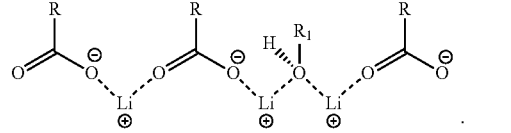

(VI)

It is to be understood that the surfactant system may consist of the lithium, one or more examples of the acid, and one or more examples of the non-ionic surfactant. As examples, the surfactant system may consist of, in addition to the lithium, dodecanoic acid and an acetylene diol (e.g., SURFYNOL® 104); or dodecanoic acid and an N-alkylpyrrolidinone (e.g., SURFADONE® LP-100 or SURFADONE® LP-300); or dodecanoic acid and oleic acid and an acetylene diol and N-alkylpyrrolidinone. It is to be further understood that the surfactant system may consist of the lithium, one example of the acid, and a combination of two or more of the non-ionic surfactants. As examples, the surfactant system may consist of, in addition to the lithium, dodecanoic acid, an acetylene diol, and a mono alcohol; or dodecanoic acid, an acetylene diol, and a bis-tartrate ester; or dodecanoic acid, an acetylene diol, and an N-alkylpyrrolidinone; or dodecanoic acid, an acetylene diol, an N-alkylpyrrolidinone, and a mono alcohol.

As mentioned above, the surfactant system not only aids in the formation of the anti-evaporative layer, but also provides suitable wetting characteristics. It is believed that the surfactant system matches or exceeds acceptable surfactant performance (e.g., compared to surfactants including ethyleneoxy groups) in terms of lowering the surface tension.

In addition to the surfactant system, examples of the ink composition disclosed herein include a colorant, a co-solvent, and a balance of water. Other additives, such as a biocide or a polymer binder may also be added to the ink composition.

The colorant may be any of self-dispersed pigments, polymer dispersed pigments, dyes, and combinations thereof.

Carbon blacks may be used as the colorant in examples of the present ink composition. For example, carbon blacks may be used that are of the lamp black, furnace black or gas black type. These carbon blacks may be made water dispersive: through oxidation, either through the carbon black process or through post carbon black manufacturing treatment (e.g., by ozonation); by reaction of the carbon black surface with either small molecule, oligomeric or polymeric materials that are water soluble or dispersive in nature (e.g., p-aminobenzoic acid, acrylic based oligomers or polymers made of monomers such as acrylic or methacrylic acid and esters thereof, and/or polyurethane oligomers or polymers). These carbon blacks may also be made dispersive in water through adsorption of oligomers or polymers of the previously mentioned acrylic, methacrylic, or polyurethane compositions. Carbon blacks can be further made dispersive through encapsulation of the pigment with a latex polymer composed of, e.g., acrylic acid, acrylic esters, methacrylic acid, methacrylic esters, styrene or vinyl acetate. These materials can be made dispersive through the inclusion of various functional groups (such as carboxylates, sulfonates, phosphates or ethylene oxide derivatives) within the polymer.

Some suitable self-dispersed carbon blacks, as well as polymer dispersed pigments are commercially available from E.I. du Pont de Nemours and Co. (Wilmington, Del.), Sensient Technologies Corporation (Milwaukee, Wis.), and Cabot Corporation (Boston, Mass.).

Other pigments with no limitation on color or chemical composition can be used, some examples of which include PY74, PY155, PY128, PY185, PR122, PR254, PR178, PV19, PB15:2, PB15:3, and PB15:4. These colorants can also be made dispersive in water by various means such as small molecule, oligomeric or polymeric attachment, through adsorption of oligomeric or polymeric materials, or through encapsulation (e.g., as described for carbon black).

Any suitable dyes may be used in examples of the present ink composition.

In the examples disclosed herein, the colorant may be present in an amount ranging from about 2 wt % to about 7 wt % of the total wt % of the ink composition. In another example, the colorant may be present in an amount ranging from about 4 wt % to about 4.5 wt % of the total wt % of the ink composition. It is to be understood that the colorant, along with the polymer binder, may be included in amounts that render the ink composition with a high solids content (i.e., total amount of colorant and binder together). In an example, the colorant loading and the polymer binder loading are selected so that the total (high) solids content of the ink composition ranges from about 4.5 wt % to about 9.0 wt % of the total weight percent of the ink composition. Examples of the polymer binder amount are described below.

The co-solvent may be 2-pyrrolidinone; sulfolane; diethyleneglycol dimethyl ether; 1-(2-hydroxyethyl)-2-pyrrolidinone (HE2P); diethyleneglycol, triethyleneglycol; tetraethylene glycol; tripropylene glycol; 1-(2-hydroxyethyl)-2-imidazolidinone; di-(2-hydroxyethyl)-5,5-dimethylhydantoin (commercially available as DANTOCOL® DHE from Lonza, Inc., Allendale, N.J.); triethyleneglycol monoethyl ether; tetraglyme; glycerol polyoxyethyl ethers; 2-methyl-1,3-propanediol; 2-ethyl-2-(hydroxymethyl)-1,3-propanediol (EHPD) (also known as trimethylolpropane); glycerol; dipropyleneglycol; 3-methyl-1,3-butanediol; 3-methyl-1,5-pentanediol; 1,6-hexanediol; 1,5-pentanediol; and combinations thereof. One specific example of a suitable combination of co-solvents includes 2-hydroxyethyl-2-pyrrolidinone and 2-pyrrolidinone. Another specific example of a suitable combination of co-solvents includes 2-hydroxyethyl-2-pyrrolidinone, 2-pyrrolidinone, and sulfolane.

The total amount of the co-solvent(s) present in the ink composition ranges from about 10 wt % to about 30 wt %. Whether a single co-solvent or a combination of two or more co-solvents is included, the total co-solvent amount is within the provided range.

Examples of the ink composition of the present disclosure may further include an additive chosen from biocides, polymer binder(s), and combinations thereof.

When a biocide is utilized, a suitable amount of the biocide may range from about 0.05 wt % to about 0.5 wt %. It is to be understood that the upper limit for the biocide(s) may depend upon the type of biocide and its toxicological effect and/or regulatory requirements. Suitable biocides include, for example, PROXEL™ GXL, KORDEK™ MLX (The Dow Chemical Co.), BIOBAN™ CS-1246 (The Dow Chemical Co.), and/or ACTICIDE® B20 and/or M20 (Thor GmbH).

The polymer binder may be a polyurethane copolymer binder or an acrylate type polymer binder. When included, the amount of the polymer binder in the ink composition may range from about 1 wt % to about 3 wt % of the total wt % of the ink composition. In another example, the amount of the polymer binder ranges from about 1.7 wt % to about 2.0 wt %. As mentioned above, the colorant loading and the polymer binder loading may be selected so that the total (high) solids content of the ink composition ranges from about 4.5 wt % to about 9.0 wt % of the total weight percent of the ink composition. When a high solids content is used, the resulting printed images may exhibit a desirable optical density and a desirable durability.

In an example, the binder used in the ink composition disclosed herein is a polyurethane copolymer binder formed from the polymerization of a diisocyanate and at least three diols. In an example, the at least three diols include a first diol containing a hydrophilic stabilizing group, and one or more of a second diol having less than 8 atoms in a backbone chain between two hydroxyl groups (which leads to the formation of a short hard segment (shown in formula (X) below)). In another example, the at least three diols include the first diol, the second diol, and a third diol having a formula OH—R—OH, wherein R is selected from the group consisting of a polyether, a polyester, a polycarbonate, a polycarbonate-co-polyester, and an acrylic. In yet another example, the at least three diols include the first diol, the second diol, and a third diol having a formula OH—$R^4$—OH, where "$R^4$" is defined in formula X below. As examples, $R^4$ may be a $C_1$-$C_7$ alkyl, or a $C_6$-$C_{40}$ aryl, or a $C_9$-$C_{40}$ aryl substituted by $C_1$-$C_{10}$ alkyl. Examples of each of the diols are provided below.

In the examples disclosed herein, the polyurethane copolymer binder is formed from the reaction of isocyanate and diols, and thus includes hard and soft segments. The hard segment is the segment in between and including two adjacent carbamate groups. The soft segment is formed from high molecular weight diols or polyols. A soft segment is mobile and may be present in a coiled formation. The urethane groups on one polymer chain form hydrogen bonds with the same or similar groups on neighboring polymer chains, resulting in a polyurethane network. In many instances, a soft continuous phase surrounds a hard semi-crystalline region in a polyurethane network.

In the polyurethane, the hard segment is covalently coupled to a soft segment. Adjusting the hard and soft segments can provide the polyurethane copolymer with a desired level of elasticity and toughness. In many polyurethanes, ionizable groups are incorporated into the hard segment to render the polyurethane water dispersible. However, ionizable groups can interfere with the inter-molecular hydrogen bonding, and thus in the examples disclosed herein, ionizable groups are not included in at least the short hard segments (e.g., see formula (X) below) of the resulting polyurethane copolymer. This strengthens the polyurethane copolymer. Separation of ionizable groups from the short hard segment can also lead to better control of the acid content while reducing the time for semi-crystalline region formation, which in turn reduces the dry-time.

In the examples disclosed herein, the ratio of the isocyanate to diol is greater than 1:1. In an example, the ratio of isocyanate to diol ranges from about 1.05:1 to about 1.5:1.

In an example, the polyurethane copolymer binder has the following structure:

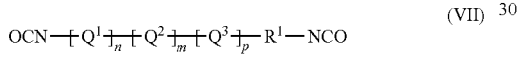
(VII)

wherein each of $Q^1$, $Q^2$, and $Q^3$ is independently selected from

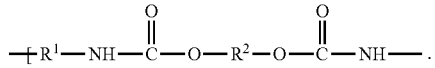
(VIII)

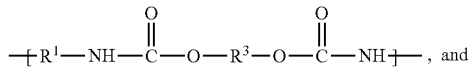
(IX)

, and

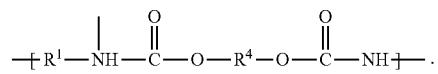
(X)

as long as $Q^1$, $Q^2$, and $Q^3$ contain at least one of (VIII), at least one of (IX), and at least one of (X). In (VIII), (IX), and/or (X), the following are applicable:

each $R^1$ is $C_1$-$C_{20}$ alkyl, $C_3$-$C_{20}$ substituted alkyl, $C_3$-$C_{10}$ cycloalkyl, $C_3$-$C_{20}$ substituted cycloalkyl, or $C_6$-$C_{40}$ aryl or $C_9$-$C_{40}$ substituted aryl from a diisocyanate;

each $R^2$ is independently $C_3$-$C_{20}$ substituted alkyl, $C_3$-$C_{20}$ substituted cycloalkyl, or $C_9$-$C_{40}$ substituted aryl;

each $R^3$ is independently $C_9$-$C_{20}$ alkyl, $C_9$-$C_{20}$ alkyl substituted by $C_1$-$C_{10}$ alkyl or $C_6$-$C_{15}$ aryl, $C_9$-$C_{40}$ aryl or $C_9$-$C_{40}$ aryl substituted by $C_1$-$C_{10}$ alkyl or $C_6$-$C_{20}$ aryl, or —($R^{11}$—O—$R^{10}$—O—$R^{11}$)—; or HO—$R^3$—OH is a diol incorporating polyether, polyester, polycarbonate, polycarbonate-co-polyester, or acrylic;

each $R^4$ is independently $C_1$-$C_7$ alkyl, $C_3$-$C_{20}$ alkyl substituted by $C_1$-$C_{10}$ alkyl or $C_6$-$C_{15}$ aryl, $C_6$-$C_{40}$ aryl or $C_9$-$C_{40}$ aryl substituted by $C_1$-$C_{10}$ alkyl or $C_6$-$C_{20}$ aryl, provided that the backbone atoms on $R^4$ forming a chain linking the two oxygen atoms in (IV) are less than 8;

n, m and p are integers from 1 to 200;

the capping agent is one or more members selected from the group consisting of $R^5CHR^6OH$, $R^5CHR^6SH$, $R^6R^7NH$, $H$—$(OR^8)_q$—OH, and epoxide $CH_2OCR^6R^7$;

each $R^5$ is H, $C_1$-$C_{20}$ alkyl, $C_3$-$C_{20}$ alkyl substituted by $C_1$-$C_{10}$ alkyl or $C_6$-$C_{15}$ aryl, $C_6$-$C_{40}$ aryl or $C_9$-$C_{40}$ aryl substituted by $C_1$-$C_{10}$ alkyl or $C_6$-$C_{20}$ aryl;

each $R^6$ is H, $C_1$-$C_{20}$ alkyl, $C_6$-$C_{40}$ aryl or —$R^9OR^8$;

each $R^7$ is H, —$R^9OR^8$, $C_1$-$C_{20}$ alkyl, $C_3$-$C_{20}$ alkyl substituted by $C_1$-$C_{10}$ alkyl or $C_6$-$C_{15}$ aryl, $C_6$-$C_{40}$ aryl or $C_9$-$C_{40}$ aryl substituted by $C_1$-$C_{10}$ alkyl or $C_6$-$C_{20}$ aryl, provided that when $R^6$ is H, $R^7$ is not H;

$R^6$ and $R^7$ can be taken together with the nitrogen atom to form a cyclic amine or substituted cyclic amine with an O or S atom replacing a C atom on said cyclic amine;

each $R^8$ is $C_1$-$C_{20}$ alkyl or $C_6$-$C_{20}$ aryl;

each $R^9$ is $C_1$-$C_{20}$ alkyl, $C_3$-$C_{20}$ alkyl substituted by $C_1$-$C_{10}$ alkyl or $C_6$-$C_{15}$ aryl;

each $R^{10}$ is independently $C_4$-$C_{20}$ alkyl, $C_4$-$C_{20}$ alkyl substituted by $C_1$-$C_{10}$ alkyl or $C_6$-$C_{15}$ aryl, $C_9$-$C_{40}$ aryl or $C_9$-$C_{40}$ aryl substituted by $C_1$-$C_{10}$ alkyl or $C_6$-$C_{20}$ aryl;

each $R^{11}$ is independently $C_1$-$C_{20}$ alkyl, $C_4$-$C_{20}$ alkyl substituted by $C_1$-$C_{10}$ alkyl or $C_6$-$C_{15}$ aryl; and q is an integer from 1 to 20.

In the examples disclosed herein, the isocyanate is a diisocyanate. Suitable diisocyanates may be selected from the group consisting of 1,6-hexamethylene diisocyanate (HDI), isophorone diisocyanate (IPDI), trimethylhexamethylene diisocyanate (TMDI), 2,4-toluene diisocyanate (2,4-TDI), 2,6-toluene diisocyanate (2,6-TDI), 4,4'-diphenylmethane diisocyanate (MDI), 4,4-dicyclohexylmethane diisocyanate ($H_{12}$MDI), 3,3'-biphenyl diisocyanate (TODI), dodecane diisocyanate ($C_{12}$DI), 1,5-naphthalene diisocyanate (NDI), m-tetramethylene xylylene diisocyanate (TMXDI), 1,4-benzene diisocyanate, trans-cyclohexane-1, 4-diisocyanate, and 4,6-xylyene diisocyanate.

Some examples of the first diol, which includes a hydrophilic stabilizing group and ultimately forms part of the monomer with Formula (VIII), include dimethylol acetic acid, 2,2'-dimethylol butanoic acid, 2,2'-dimethylol propionic acid (DMPA), and 2,2'-dimethylol butyric acid.

Some examples of the second diol, which has less than 8 atoms in the backbone chain between two hydroxyl group and ultimately forms part of the monomer with Formula (X), include 1,2-propanediol, 1,3-propanediol, ethylene glycol, 1,4-butanediol, 1,5-pentanediol, 1,6-hexanediol, 1,2-hexanediol, neopentyl glycol, 2-methyl-1,3-propanediol, 3-methyl-1,5-pentane diol, and combinations thereof.

When included, examples of the third diol have a hydrophobic segment and ultimately form part of the monomer with Formula (IX). Some examples of this third diol have the formula OH—R—OH, wherein R is selected from the group consisting of a polyether, a polyester, a polycarbonate, a polycarbonate-co-polyester, and an acrylic. Other examples of the third diol have the formula OH—$R^4$—OH. $R^4$ may be any of the examples previously given, such as a $C_1$-$C_7$ alkyl, or a $C_6$-$C_{40}$ aryl, or a $C_9$-$C_{40}$ aryl substituted by $C_1$-$C_{10}$ alkyl.

Any suitable method that reacts the isocyanate with the at least three diols may be used to form the polyurethane copolymer. The previously mentioned capping agent may be added when it is desirable to terminate the polymerization. The amount of the capping agent employed should be approximately equivalent to the unreacted isocyanate groups in the prepolymer. The ratio of active hydrogens from amine groups in the chain terminator to isocyanate groups in the prepolymer are in the range from about 1.0:1 to about 1.2:1, or from about 1.0:1.1 to about 1.1:1, or from about 1.0:1.05 to about 1.1:1, on an equivalent basis.

In the final polyurethane copolymer binder, the mole percentage of the second diol is at least 30% of a total mole percentage of diol monomers in the polyurethane copolymer binder. The acid number of the polyurethane copolymer binder ranges from 50 to 70, and the number average ($M_n$) molecular weight of the polyurethane copolymer binder ranges from about 3,500 to about 10,000. In another example, the $M_n$ of the polyurethane copolymer binder ranges from about 5,000 to about 8,500.

As mentioned above, the polymer binder may be an acrylate type polymer. Suitable acrylate polymers can consist of polymers having a molecular weight ranging from about 2000 to about 200,000, an acid number of from about 30 to about 180. Some examples of suitable monomers include acrylic acid, methacrylic acid, and esters of both acrylic acid and methacrylic acid.

When the acrylate type polymer binder or the polyurethane copolymer binder is used, it is to be understood the co-solvent(s) may be selected to desirably disperse the binder throughout the ink composition.

In any of the examples disclosed herein, a balance (up to 100 wt %) of the composition is water.

The pH of examples of the ink composition generally ranges from about 7 to about 11. It may be desirable that the ink composition have a basic pH, ranging anywhere from greater than 7 to 12. When the initial pH of the resulting ink composition is acidic, neutral, or near-neutral basic (e.g., having a pH ranging from 7.1 to 8), it may be desirable to adjust the pH of the resulting ink composition to a basic or more basic pH. Any suitable base may be added to adjust the pH, as long as the added base does not interfere with the other desirable properties of the ink composition. Some examples of suitable bases include NaOH or KOH. The amount of base added depends, at least in part, on the initial pH of the ink composition and the desired final pH of the ink composition. In an example, the pH is adjusted to from about 9 to about 10, and a suitable amount of base is added until this pH is obtained.

In addition, it is to be understood that the ink composition disclosed herein may be particularly suitable for any inkjet printing system having a drop frequency ranging from about 2 kHz to about 36 kHz. In an example of high speed printing, the drop frequency may range from about 24 kHz to about 36 kHz. The inkjet printing systems may be thermal or piezoelectric.

Referring now to FIG. 1, a print cartridge is generally depicted at 10. The print cartridge 10 includes a housing 12 (which may include one or more layers of different materials) that is operatively connected to a reservoir 14 that contains an example of the ink composition 20 disclosed herein. A fluid path/ink channel 24 connects the reservoir 14 to a fluid ejector 16. In a thermal inkjet print cartridge, the fluid ejector 16 is a heating element that creates heat to vaporize the ink composition 20, which creates a bubble that expands to push the ink composition 20 (in the form of drops 22) out of an orifice 26 of a nozzle 18 that is aligned with the fluid ejector 16. While a single fluid ejector 16 and nozzle 18 is shown, it is to be understood that a single print cartridge 10 may include multiple (e.g., 400 or some other desirable number) fluid ejectors 16 and nozzles 18. While not shown, it is to be understood that the print cartridge 10 includes an integrated circuit that routes signals (e.g., from a processor that is capable of running suitable computer readable instructions) to the desirable fluid ejector(s) 16 and nozzle(s) 18 for firing ink drops 22 therefrom to produce images on a desirable medium.

The print cartridge 10 is representative of a single nozzle, and it is to be understood that a single print cartridge includes many nozzles. When included in a high speed inkjet printing system including a page wide array, it is to be understood that several print cartridges 10 (i.e., dies), each of which includes at least 1,000 nozzles, are arranged together. While not shown, it is to be understood that the high speed inkjet printing system may also include an automated service station. This service station may be programmed to ensure that the print cartridge 10 is automatically capped, decapped, and cleaned with minimal system downtime. This also contributes to enhanced print quality.

As mentioned above, examples of surfactant system in the ink composition 20 form the anti-evaporative layer during uncapped non-use at an interface I between air and the ink composition 20 in the orifice 26 of the nozzle 18, thereby reducing evaporation of the water from the ink composition 20.

Figure 2:
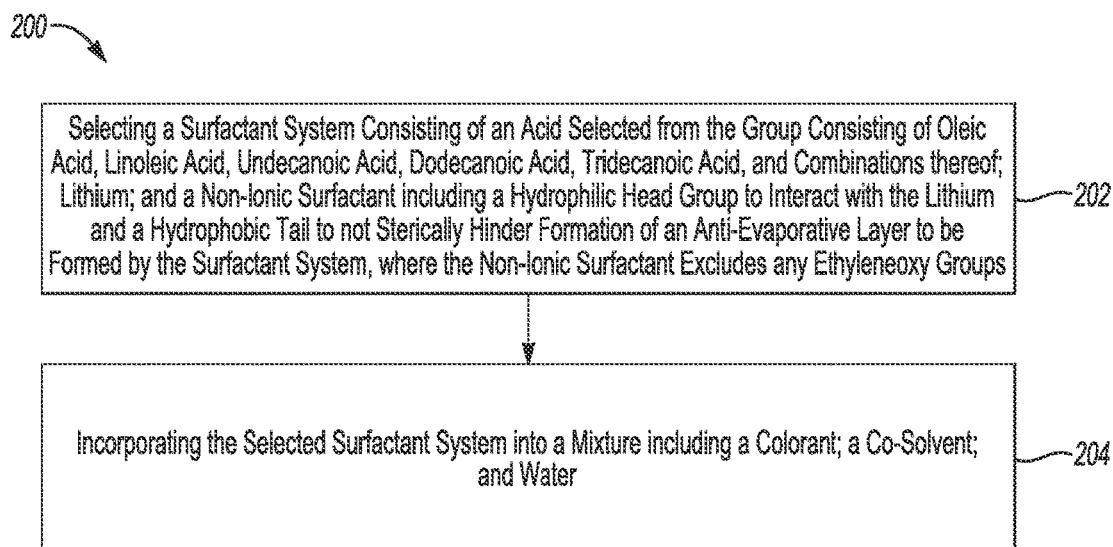
FIG. 2 is a flow diagram illustrating an example of a method according to an example of the present disclosure.

Referring now to FIG. 2, an example of a method for improving decap performance of the ink composition 20 according to the present disclosure is generally depicted at 200. The method 200 includes selecting a surfactant system, as shown at reference numeral 202. The surfactant system consists of the acid (selected from the group consisting of oleic acid, linoleic acid, undecanoic acid, dodecanoic acid, tridecanoic acid, and combinations thereof); lithium; and the non-ionic surfactant including the hydrophilic head group to interact with the lithium and the hydrophobic tail to not sterically hinder formation of an anti-evaporative layer formed by the surfactant system. As previously described, the selected non-ionic surfactant excludes any ethyleneoxy groups. As shown at reference numeral 204, the method 200 further includes incorporating the selected surfactant system into a mixture, including a colorant; a co-solvent; and water.

To further illustrate the present disclosure, examples are given herein. It is to be understood that these examples are provided for illustrative purposes and are not to be construed as limiting the scope of the present disclosure.

Example

Twenty four example inks (Inks 1-20, 22, 23, 28 and 29) including examples of the surfactant system disclosed herein were prepared. Five comparative inks (Inks 21 and 24-27) were also prepared. One comparative ink (ink 30) with no surfactant system was also prepared.

In each of the example inks and the comparative example inks, the colorant was a self-dispersing carbon black dispersion (C K), the co-solvents were 1-(2-hydroxyethyl)-2-pyrrolidinone (HE2P) and 2-pyrrolidinone (2P), and the polymer binder was a polyurethane (PU) dispersion (including an example of the polyurethane copolymer binder in sulfolane). The polyurethane copolymer binder in comparative inks 21 and 24-27 and in inks 20, 22, 23, 28, and 29 was formed from the reaction of isophorone diisocyanate (IPDI) with 1,3-propanediol, hydroquinone bis(2-hydroxyethyl)

ether (HQEE), and dimethylol propionic acid (DMPA). The polyurethane copolymer binder in comparative ink 30 and inks 1-19 was formed from the reaction of isophorone diisocyanate (IPDI) with 1,3-propanediol, 1,2-propanediol, and dimethylol propionic acid (DMPA).

In some of the example inks (20, 22, 23, 28, and 29) and some of the comparative example inks (21 and 24-27), the carbon self-dispersing black dispersion and the polyurethane dispersion were blended and any solvent was removed before being added to the ink or comparative ink composition. As such, these inks and comparative inks do not include sulfolane. In the other example inks and comparative ink 30, the polyurethane dispersion was added to the ink composition, and thus the final composition included sulfolane, at least some of which came from the polyurethane dispersion (as shown in Table 1).

The surfactant system in the example inks included dodecanoic acid (DA, as the acid), lithium (Li), and one or a combination of the non-ionic surfactants provided herein. The surfactant system in each of the comparative inks included dodecanoic acid, lithium, and at least a surfactant that includes ethyleneoxy groups.

The formulations of the inks and comparative inks are shown in Table 1. The non-ionic surfactants and the amounts used in the inks and comparative inks are also specifically set forth in the column labeled "surfactant system" Table 1, where each non-ionic surfactant (NI Surf) name is provided as well as the weight percent of that non-ionic surfactant. The balance was water. The pH of each of the inks and comparative inks was between 8 and 11.

TABLE 1

| Ink | HE2P wt % | 2P wt % | CK wt % | PU wt % | Sulfolane wt % | DA wt % | Li ppm | Surfactant System NI Surf Name (wt %) |
|---|---|---|---|---|---|---|---|---|
| Ink 1 | 12.0 | 6.0 | 4.5 | 1.7 | 4.0 | 0.18 | 205 | SURFYNOL ® 104 (0.05) |
| Ink 2 | 12.0 | 6.0 | 4.5 | 1.7 | 3.7 | 0.18 | 205 | SURFYNOL ® 104 (0.05) |
| Ink 3 | 12.0 | 6.0 | 4.4 | 1.9 | 1.9 | 0.18 | 205 | SURFADONE ® LP 100 (0.05) SURFYNOL ® 104 (0.05) |
| Ink 4 | 12.0 | 6.0 | 4.4 | 1.9 | 1.9 | 0.18 | 205 | lauryl alcohol (0.1) SURFYNOL ® 104 (0.05) |
| Ink 5 | 12.0 | 6.0 | 4.4 | 1.9 | 1.9 | 0.18 | 205 | oleyl alcohol (0.1) SURFYNOL ® 104 (0.05) |
| Ink 6 | 12.0 | 6.0 | 4.4 | 1.9 | 1.9 | 0.18 | 205 | stearyl alcohol (0.1) SURFYNOL ® 104 (0.05) |
| Ink 7 | 12.0 | 6.0 | 4.4 | 1.9 | 1.9 | 0.18 | 205 | Diisopropyl tartrate (0.1) SURFYNOL ® 104 (0.05) |
| Ink 8 | 12.0 | 6.0 | 4.4 | 1.9 | 1.9 | 0.18 | 205 | Dibenzyl tartrate (0.1) SURFYNOL ® 104 (0.05) |
| Ink 9 | 12.0 | 6.0 | 4.4 | 1.9 | 1.9 | 0.18 | 205 | Dibutyl tartrate (0.1) SURFYNOL ® 104 (0.05) |
| Ink 10 | 12.0 | 8.0 | 4.4 | 1.7 | 1.7 | 0.18 | 205 | lauryl alcohol (0.1) SURFYNOL ® 104 (0.05) |
| Ink 11 | 12.0 | 8.0 | 4.4 | 1.7 | 1.7 | 0.18 | 205 | lauryl alcohol (0.05) SURFYNOL ® 104 (0.05) |
| Ink 12 | 12.0 | 8.0 | 4.4 | 1.7 | 1.7 | 0.18 | 205 | lauryl alcohol (0.02) SURFADONE ® LP 100 (0.03) SURFYNOL ® 104 (0.05) |
| Ink 13 | 12.0 | 8.0 | 4.4 | 1.7 | 1.7 | 0.18 | 205 | lauryl alcohol (0.03) SURFADONE ® LP 100 (0.02) SURFYNOL ® 104 (0.05) |
| Ink 14 | 12.0 | 6.0 | 4.4 | 1.9 | 1.9 | 0.18 | 205 | lauryl alcohol (0.1) SURFYNOL ® 104 (0.05) |
| Ink 15 | 12.0 | 8.0 | 4.4 | 1.7 | 1.7 | 0.18 | 205 | oleyl alcohol (0.1) SURFYNOL ® 104 (0.05) |
| Ink 16 | 12.0 | 8.0 | 4.4 | 1.7 | 1.7 | 0.18 | 205 | oleyl alcohol (0.05) SURFYNOL ® 104 (0.05) |
| Ink 17 | 12.0 | 8.0 | 4.4 | 1.7 | 1.7 | 0.18 | 205 | oleyl alcohol (0.05) SURFADONE ® LP 100 (0.05) SURFYNOL ® 104 (0.05) |
| Ink 18 | 12.0 | 8.0 | 4.4 | 1.7 | 1.7 | 0.18 | 205 | oleyl alcohol (0.02) SURFADONE ® LP 100 (0.03) SURFYNOL ® 104 (0.05) |
| Ink 19 | 12.0 | 6.0 | 4.4 | 1.9 | 1.9 | 0.18 | 205 | oleyl alcohol (0.1) SURFYNOL ® 104 (0.05) |
| Ink 20 | 12.0 | 6.0 | 4.5 | 2.0 | None | 0.36 | 94 | SURFYNOL ® 104 (0.25) |
| Comp. Ink 21 | 12.0 | 6.0 | 4.5 | 2.0 | None | 0.36 | 94 | SURFYNOL ® 465* (0.2) SURFYNOL ® 104 (0.2) |
| Ink 22 | 12.0 | 6.0 | 4.5 | 2.0 | None | 0.36 | 94 | SURFADONE ® LP 100 (0.25) |
| Ink 23 | 12.0 | 6.0 | 4.5 | 2.0 | None | 0.36 | 94 | SURFYNOL ® 104 (0.25) |
| Comp. Ink 24 | 12.0 | 6.0 | 4.5 | 2.0 | None | 0.36 | 94 | SURFYNOL ® 420* (0.25) |
| Comp. Ink 25 | 12.0 | 6.0 | 4.5 | 2.0 | None | 0.36 | 94 | SURFYNOL ® 440* (0.25) |
| Comp. Ink 26 | 12.0 | 6.0 | 4.5 | 2.0 | None | 0.36 | 94 | SURFYNOL ® 465* (0.25) |
| Comp. Ink 27 | 12.0 | 6.0 | 4.5 | 2.0 | None | 0.36 | 94 | SURFYNOL ® 485* (0.25) |

TABLE 1-continued

| Ink | HE2P wt % | 2P wt % | CK wt % | PU wt % | Sulfolane wt % | DA wt % | Li ppm | Surfactant System NI Surf Name (wt %) |
|---|---|---|---|---|---|---|---|---|
| Ink 28 | 12.0 | 6.0 | 4.5 | 2.0 | None | 0.36 | 94 | SURFYNOL ® 104 (0.1) |
| Ink 29 | 12.0 | 6.0 | 4.5 | 2.0 | None | 0.36 | 94 | SURFYNOL ® 104 (0.15) |
| Ink 30 | 12.0 | 6.0 | 4.5 | 1.7 | 1.9 | 0.18 | 205 | None |

*Surfactant including ethyleneoxy groups

The surface tension of each of the example inks and comparative inks was measured. The results are shown in Table 2. The surface tension was measured using the Wilhelmy plate method on a Kruss surface tensiometer K11.

The decap performance of the example inks and comparative inks was evaluated. The print system used in this example spits drops (to maintain print health) on a page ("spit on page" (SoP)). The inks and comparative inks were filled into HP 940 cartridges, and a nozzle check pattern was printed using an HP OfficeJet Pro 8000 series printer. Just prior to the beginning of the test, the nozzles were primed, and a nozzle check pattern was performed to ensure all nozzles were firing acceptably. During each scan across the page, the pen prints a pattern of 151 vertical lines (including an initial 0 second reference line) spaced about one sixteenth of an inch apart. A vertical line was formed by all nozzles firing one drop. As such, each line was one drop wide and about ⅞ of an inch high, corresponding to the length of the nozzle array on the printhead. The first vertical line in each scan is the first drop fired from each nozzle after no wait time, the second line is printed after 4 seconds of decap time, the third line was printed after an additional 4 seconds of decap time, and so forth for all 151 lines. "Bad" decap indicates most of the nozzles missing or misfiring; whereas "Good" decap indicates nozzles firing properly for all 151 lines.

TABLE 2

| Ink | Surface Tension (Dynes/cm) | Decap |
|---|---|---|
| Ink 1 | 36.8 | Good |
| Ink 2 | 37.3 | Good |
| Ink 3 | 35.7 | Good |
| Ink 4 | 23.1 | Good |
| Ink 5 | 29.3 | Good |
| Ink 6 | 36.8 | Good |
| Ink 7 | 36.6 | Good |
| Ink 8 | 39.8 | Good |
| Ink 9 | 37.1 | Good |
| Ink 10 | 23.8 | Good |
| Ink 11 | 26.1 | Good |
| Ink 12 | 34.3 | Good |
| Ink 13 | 32.6 | Good |
| Ink 14 | 23.5 | Good |
| Ink 15 | 29.8 | Good |
| Ink 16 | 30.2 | Good |
| Ink 17 | 29.9 | Good |
| Ink 18 | 34.1 | Good |
| Ink 19 | 29.4 | Good |
| Ink 20 | 30.1 | Good |
| Comp. Ink 21 | 30.6 | Bad |
| Ink 22 | 33.6 | Good |
| Ink 23 | 29.4 | Good |
| Comp. Ink 24 | 30.2 | Bad |
| Comp. Ink 25 | 31.8 | Bad |
| Comp. Ink 26 | 36.3 | Bad |
| Comp. Ink 27 | 39.3 | Bad |
| Ink 28 | 32.2 | Good |
| Ink 29 | 31.2 | Good |
| Ink 30 | 44.2 | Good |

The surface tension results shown in FIG. 2 illustrate that the surface tension of the inks including the example surfactant system disclosed herein (without any ethyleneoxy groups) is comparable to, and in some instances even lower than, the comparative surfactant systems including surfactants with ethyleneoxy groups. The surface tension of comparative ink 30, without any surfactant system, was the highest.

The decap results shown in FIG. 2 illustrate that when surfactants including ethyleneoxy groups are included, the decap performance is deleteriously affected. In contrast, the various example inks including different examples of the surfactant systems disclosed herein, which do not include ethyleneoxy groups, exhibit good decap performance.

While comparative ink 30 (with no surfactant system) exhibited good decap, the surface tension was undesirably high. Furthermore, it was also observed that comparative ink 30 (having no surfactant system) also had poor nozzle health, and the nozzles were dirty after use. As such, without the surfactant system disclosed herein, tradeoffs would have to be made between SoP decap and other print characteristics, such as pen/nozzle wetting, dry time, print quality, etc.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range of 50 ppm to about 400 ppm should be interpreted to include not only the explicitly recited limits of 50 ppm to about 400 ppm, but also to include individual values, such as 53 ppm, 104.25 ppm, 350 ppm, etc., and sub-ranges, such as from about 150 ppm to about 375 ppm, from 125 ppm to about 300 ppm, etc. Furthermore, when "about" or "substantially" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. An ink composition, comprising:
   a colorant;
   a co-solvent;
   a surfactant system, consisting of:
      an acid selected from the group consisting of undecanoic acid, dodecanoic acid, tridecanoic acid, and combinations thereof;
      lithium; and
      a non-ionic surfactant including a hydrophilic head group to interact with the lithium and a hydrophobic tail to not sterically hinder formation of an anti-evaporative layer to be formed by the surfactant system, the non-ionic surfactant excluding any ethyleneoxy groups; and
   water;
   wherein the ink composition excludes stearic acid, linolenic acid, linear saturated fatty acids having a carbon chain of fewer than 11 carbons, and linear saturated fatty acids having a carbon chain of more than 13 carbons.

2. The ink composition as defined in claim 1 wherein the non-ionic surfactant is selected from the group consisting of acetylene diol, bis-tartrate esters, 1,2-hexanediol, mono alcohols, N-alkylpyrrolidinones, and combinations thereof.

3. The ink composition as defined in claim 1 wherein the non-ionic surfactant comprises a bis-tartrate ester selected from the group consisting of dibutyl tartrate, dibenzyl tartrate, and diisopropyl tartrate.

4. The ink composition as defined in claim 1 wherein the non-ionic surfactant comprises a mono alcohol selected from the group consisting of lauryl alcohol, oleyl alcohol, stearyl alcohol, and combinations thereof.

5. The ink composition as defined in claim 1 wherein the surfactant system consists of lithium and one of:
   dodecanoic acid and acetylene diol;
   dodecanoic acid, acetylene diol, and a mono alcohol selected from the group consisting of lauryl alcohol, oleyl alcohol, and stearyl alcohol;
   dodecanoic acid, acetylene diol, and a bis-tartrate ester selected from the group consisting of dibutyl tartrate, dibenzyl tartrate, and diisopropyl tartrate;
   dodecanoic acid, acetylene diol, and an N-alkylpyrrolidinone;
   dodecanoic acid, acetylene diol, an N-alkylpyrrolidinone, and a mono alcohol selected from the group consisting of lauryl alcohol, oleyl alcohol, and stearyl alcohol; or
   dodecanoic acid and an N-alkylpyrrolidinone.

6. The ink composition as defined in claim 1, excluding alkali metal salts other than the lithium.

7. The ink composition as defined in claim 1 wherein a pH of the ink composition ranges from about 7 to about 11.

8. The ink composition as defined in claim 1 wherein the colorant is selected from the group consisting of self-dispersed pigments, polymer dispersed pigments, dyes, and combinations thereof.

9. The ink composition as defined in claim 1 wherein the co-solvent includes 2-pyrrolidinone; sulfolane; diethyleneglycol dimethyl ether; 1-(2-hydroxyethyl)-2-pyrrolidinone; diethyleneglycol, triethyleneglycol; tripropylene glycol; tetraethylene glycol; 1-(2-hydroxyethyl)-2-imidazolidinone; di-(2-hydroxyethyl)-5,5-dimethylhydantoin; triethyleneglycol monoethyl ether; tetraglyme; glycerol polyoxyethyl ethers; 2-methyl-1,3-propanediol; 2-ethyl-2-(hydroxymethyl)-1,3-propanediol; glyceroldipropyleneglycol; 3-methyl-1,3-butanediol; 3-methyl-1,5-pentanediol; 1,6-hexanediol; 1,5-pentanediol; and combinations thereof.

10. The ink composition as defined in claim 1, further comprising an additive selected from the group consisting of biocides, polyurethane binders, acrylate polymer binders, and combinations thereof.

11. The ink composition as defined in claim 10 wherein the additive is the polyurethane binder and the polyurethane binder is a polyurethane copolymer binder formed from the polymerization of a diisocyanate and at least three diols including a first diol containing a hydrophilic stabilizing group, and a second diol having less than 8 atoms in a backbone chain between two hydroxyl groups, wherein a mole percentage of the second diol is at least 30% of a total mole percentage of diol monomers in the polyurethane copolymer binder, and wherein an acid number of the polyurethane copolymer ranges from 50 to 70.

12. The ink composition as defined in claim 1 wherein:
   the colorant is present in an amount ranging from about 2 wt % to about 7 wt %;
   the co-solvent is present in an amount ranging from about 10 wt % to about 30 wt %;
   the acid is present in an amount ranging from about 0.03 wt % to about 1.0 wt %;
   the non-ionic surfactant is present in an amount ranging from about 0.01 wt % to about 0.3 wt %;
   the lithium is present in an amount ranging from about 50 ppm to about 400 ppm; and
   a balance of the composition is the water.

13. A print cartridge, comprising:
   a fluid reservoir;
   a fluid ejector in fluid communication with the fluid reservoir;
   a nozzle in fluid communication with the fluid ejector;
   an ink composition present in the fluid reservoir, the ink composition including:
      a colorant;
      a co-solvent;
      a surfactant system, consisting of:
         an acid selected from the group consisting of undecanoic acid, dodecanoic acid, tridecanoic acid, and combinations thereof;
         lithium; and
         a non-ionic surfactant including a hydrophilic head group to interact with the lithium and a hydrophobic tail to not sterically hinder formation of an anti-evaporative layer to be formed by the surfactant system, the non-ionic surfactant excluding any ethyleneoxy groups; and
      water;
      wherein the ink composition excludes stearic acid, linolenic acid, linear saturated fatty acids having a carbon chain of fewer than 11 carbons, and linear saturated fatty acids having a carbon chain of more than 13 carbons;
   the anti-evaporative layer present at an interface between air and the ink composition in an orifice of the nozzle, the anti-evaporative layer formed during uncapped non-use, thereby reducing evaporation of the water from the ink composition.

14. The print cartridge as defined in claim 13 wherein the surfactant system consists of lithium and one of:
   dodecanoic acid and acetylene diol;
   dodecanoic acid, acetylene diol, and a mono alcohol selected from the group consisting of lauryl alcohol, oleyl alcohol, and stearyl alcohol;

dodecanoic acid, acetylene diol, and a bis-tartrate ester selected from the group consisting of dibutyl tartrate, dibenzyl tartrate, and diisopropyl tartrate;

dodecanoic acid, acetylene diol, and an N-alkylpyrrolidinone;

dodecanoic acid, acetylene diol, an N-alkylpyrrolidinone, and a mono alcohol selected from the group consisting of lauryl alcohol, oleyl alcohol, and stearyl alcohol; or dodecanoic acid and an N-alkylpyrrolidinone.

15. A method for improving decap of an ink composition, the method comprising:

selecting a surfactant system, consisting of:
- an acid selected from the group consisting of undecanoic acid, dodecanoic acid, tridecanoic acid, and combinations thereof;
- lithium; and
- a non-ionic surfactant including a hydrophilic head group to interact with the lithium and a hydrophobic tail to not sterically hinder formation of an anti-evaporative layer to be formed by the surfactant system, the non-ionic surfactant excluding any ethyleneoxy groups; and incorporating the selected surfactant system into a mixture to form the ink composition, the mixture including:
- a colorant;
- a co-solvent; and
- water;

wherein the ink composition excludes stearic acid, linolenic acid, linear saturated fatty acids having a carbon chain of fewer than 11 carbons, and linear saturated fatty acids having a carbon chain of more than 13 carbons.

16. An ink composition, comprising:

a colorant;

a co-solvent;

a surfactant system, consisting of:
- an acid selected from the group consisting of oleic acid, linoleic acid, undecanoic acid, dodecanoic acid, tridecanoic acid, and combinations thereof;
- lithium; and
- a non-ionic surfactant including a hydrophilic head group to interact with the lithium and a hydrophobic tail to not sterically hinder formation of an anti-evaporative layer to be formed by the surfactant system, the non-ionic surfactant excluding any ethyleneoxy groups, wherein the non-ionic surfactant comprises bis-tartrate esters selected from the group consisting of dibutyl tartrate, dibenzyl tartrate, and diisopropyl tartrate; and water.

17. The ink composition as defined in claim 16 wherein the ink composition excludes stearic acid, linolenic acid, linear saturated fatty acids having a carbon chain of fewer than 11 carbons, and linear saturated fatty acids having a carbon chain of more than 13 carbons.

* * * * *